United States Patent [19]

Hay et al.

[11] Patent Number: 5,261,947
[45] Date of Patent: Nov. 16, 1993

[54] PROCESS FOR THE PRODUCTION OF A GAS HAVING A SUBSTANTIAL OXYGEN CONTENT

[75] Inventors: Léon Hay, Paris; Sylvie Eteve, Fontenay-aux-Roses, both of France

[73] Assignee: L'Air Liquide, Societe Anonyme pour l'Etude et l'Exploitation des Procedes Georges Claude, Paris, France

[21] Appl. No.: 962,259

[22] Filed: Oct. 16, 1992

[30] Foreign Application Priority Data

Oct. 17, 1991 [FR] France ............... 91 12806

[51] Int. Cl.$^5$ ............................................. B01D 53/04
[52] U.S. Cl. ......................................... 95/101; 95/102; 95/130
[58] Field of Search ................ 55/25, 26, 58, 62, 68, 55/74, 75

[56] References Cited

U.S. PATENT DOCUMENTS

| | | | |
|---|---|---|---|
| 3,430,418 | 3/1969 | Wagner | 55/62 X |
| 3,564,816 | 2/1971 | Batta | 55/26 |
| 3,720,042 | 3/1973 | Simonet | 55/25 |
| 4,077,780 | 3/1978 | Doshi | 55/26 |
| 4,461,630 | 7/1984 | Cassidy et al. | 55/25 |
| 4,614,525 | 9/1986 | Reiss | 55/25 |
| 4,813,977 | 3/1989 | Schmidt et al. | 55/26 |
| 4,969,935 | 11/1990 | Hay | 55/26 |
| 4,981,499 | 1/1991 | Hay et al. | 55/26 |
| 5,015,272 | 5/1991 | Okada et al. | 55/62 |
| 5,026,406 | 6/1991 | Kumar | 55/62 X |

FOREIGN PATENT DOCUMENTS

| | | |
|---|---|---|
| 0248720 | 12/1987 | European Pat. Off. |
| 0350373 | 1/1990 | European Pat. Off. |
| 2633846 | 1/1990 | France |

*Primary Examiner*—Robert Spitzer
*Attorney, Agent, or Firm*—Curtis, Morris & Safford

[57] ABSTRACT

The selective adsorption of nitrogen from air is used in a system including a number of adsorbers, to give oxygen enriched gas at elevated pressure, the adsorber is regenerated by depressurization under atmospheric pressure with a pump and by repressurization with oxygen enriched gas. The pumping duration is at most equal to the duration of the production step.

11 Claims, 4 Drawing Sheets

PROCESS FOR THE PRODUCTION OF A GAS HAVING A SUBSTANTIAL OXYGEN CONTENT

BACKGROUND OF THE INVENTION (a) Field of the Invention

The present invention concerns the production of an oxygen enriched gas from air and by adsorption, according to a process of the "PSA" ("pressure swing adsorption") type carried out between an elevated pressure $P_M$ and a low pressure $P_m$ which is lower than the atmospheric pressure obtained by pumping.

(b) Description of Prior Art

The apparatuses of this type intended for the industrial production of oxygen by fractionning air over zeolites, for example of the 5A or 13X type, give oxygen enriched air up to 95% oxygen contents (the residual 5% essentially consisting of argon).

In a large number of applications, a production quality of 90/93% oxygen content is however sufficient. In this same range of contents, the quantities of oxygen required by the application may be from a few tons/day to a few hundreds of tons/day.

These known industrial apparatuses have been developed within the range of 10 to 50 T/d of oxygen, and they have appeared to be very cost competitive as compared to the oxygen obtained by cryogenic means and supplied in liquid form.

The different types of cycles proposed in these apparatuses generally comprise from 2 to 4 adsorbers, one of which is in production, while the other (or the others) are either being regenerated or are in intermediate phase (flushing, repressurizing . . . ).

Since these cycles have a duration which generally varies between 90 seconds and a few minutes, the volume of the adsorbers for a given cycle and a predetermined duration increases in proportion to the flow to be produced. The compliance with the rules of speed of flow of the gas in certain phases, to prevent the attrition of the absorbent, imposes a minimum cross section to the flow of gas, which, for large sizes, directly or indirectly becomes the limiting factor. In the case of adsorbers of vertical cylindrical shape and with vertical circulation of gas, the diameter of the adsorber becomes too large beyond a certain size of the apparatus (limitation of the diameter of the bottoms and sleeves, problems of transportation . . . ).

In the case of adsorbers of horizontal cylindrical shape and with vertical circulation of gas, which enable larger flows than in the preceding case to pass therethrough, with the same diameter, the use of large flows present problems of gas distribution in the internal collectors on both sides of the adsorbent, as well as of an increase of dead volume in these collectors. On the other hand, in same phases, kinetic phenomenons require minimum durations to prevent a degradation of the performances, which determines, for an adsorbent of given granulometry, an optimum duration of cycle.

Bearing in mind the requirements of attrition, kinetic and technological limitations, the limitation of such an apparatus for the production of oxygen is believed to be about 60 T/d.

In the case where an application requires more important quantities of over-oxygenated air, for example 300 T/d, the actual solution is either to install a plurality of units in parallel (for example 3 units of 50 T/d each, for the production of 150 T/d), or to go to the solution of utilizing cryogenic means.

SUMMARY OF INVENTION

The problem that the invention aims at solving is to extend the actual tonnage limits of the apparatuses for the industrial production of oxygen, with a lower production cost than the one which would result from the use in parallel of a plurality of independent units. More specifically, it is an object of the invention to produce with a single unit, a quantity of oxygen that could be much higher than 60 T/d, which, in production cost, decreases the portion of fixed fees (civil engineering, general engineering, mounting, starting up), and also reduces the investment portion (material, adsorbent . . . ) as compared to the cost resulting from the juxtaposition of a plurality of units.

These objects of the invention are reached, in a process of the type mentioned above wherein, on a plurality of n adsorbers, there is successively provided, cyclically according to a period T, on each of said adsorbers, a dephasing of duration T/n from one adsorber to the following:

a) a step of co-current production of oxygen, of duration x, at a pressure at least equal to atmospheric pressure, with introduction of air at least during a substantial portion of said step of production;

b) a step of depressurization, comprising at least in the last part thereof, a counter-current depressurization until reaching a sub-atmospheric pressure obtained by pumping; said pumping being followed, possibly, by a flushing-elution through a counter-current flow of oxygen enriched gas; the minimum cycle pressure reached during said pumping step being $P_m$;

c) a step of repressurization comprising at least a phase of counter-current repressurization with oxygen enriched gas characterized by the combination of the following steps:

d) the number of adsorbers is at least 3;

e) the duration of the production step is longer than dephasing T/n;

f) the sum of the durations of counter-current depressurization and the optional flushing-elution is at most equal to the duration of the production step;

g) the step of pumping according to b) is carried out by means of "k" systems of pumping ($k \geq 1$), each being adapted to a level of partial depressurization and exerting its action successively on a same adsorber during a pumping of duration y, so that $$(k-1)\frac{T}{n} < y \leq k\frac{T}{n},$$

with "k" lower by at least one unit than the maximum number of adsorbers which are in simultaneous production during at least a fraction of the time interval T/n.

The expression system of pumping, means either a pump and its associated motor, or a pump stage or pump body and in this case, a plurality of pumping systems may be connected to a single motor, or a plurality of pumps mounted in parallel and pumping, at a given moment, the gas from a single and same adsorber.

The depressurization gas, which is introduced counter-currently according to step c) is an initial depressurization gas from another adsorber and/or a production gas from still at least another adsorber. Possibly, a portion of the repressurization gas according to c) consists of air introduced co-currently.

The maximum cycle pressure is generally between atmospheric pressure and $1.6 \times 10^5$ Pascal, while the minimum cycle pressure is between $0.2 \times 10^5$ and $0.5 \times 10^5$ Pascal.

BRIEF DESCRIPTION OF DRAWINGS

The invention is now described with reference to the annexed drawings, in which.

DESCRIPTION OF PREFERRED EMBODIMENTS

As usual, it is pointed out that the expressions "co-current" and "counter-current" are used when the gas circulates int eh adsorber, respectively from the inlet orifice of the mixture to be treated towards the outlet orifice of the production gas and respectively vice-versa. On the pressure diagrams, the co-current direction extends towards the top of the sheet parallel to the axis of the ordinates "(pressure)", while the counter-current direction is opposite thereto. When the arrow which is indicative of the direction of gaseous flow extends through the diagram, this means that the gas passes through the adsorber from one orifice (inlet or outlet) to the other (outlet or inlet respectively).

When the arrow originates or terminates on the diagram, this means that one of the orifices is closed, i.e. it is being emptied or filled respectively.

On the drawings and in the description which follows the following abbreviations and designations are found:
T duration—or period—of a cycle;
n number of adsorbers in a group of adsorbers;
T/n dephasing between two consecutive adsorbers;
N number of adsorbers in simultaneous production
t1 start of the step of co-current production;
t2 end of the step of co-current production or start of the optional step of initial co-current depressurization;
t3 end of the optional step of initial co-current depressurization or start of the step of counter-current depressurization;
t4 end of the step of counter-current depressurization, before the optional flushing-elution;
t5 end of the optional step of flushing-elution;
t6 end of the optional step of partial repressurization up to an intermediate pressure;
t7 end of the step of final repressurization;
d1 duration of the step of co-current production;
d2 duration of the step of optional co-current depressurization;
d3 duration of counter-current depressurization before optional flushing-elution;
d4 duration of flushing-elution;
d5 duration of counter-current repressurization;
d6 duration of co-current repressurization;
d7 duration of counter-current pumping with flushing-elution, if any;
k number of pumping system.

Reference is now made to the different FIGS. 1 to 8, on which times corresponding to the cycle duration and the different steps are given by way of example, on the basis of a time of adsorption, including air admission in an adsorber, fixed at 60 s; this time being generally comprised between 30 and 120 s in the case of "PSA" industrial oxygen loaded with adsorbent either in the form of balls of diameter between 1 and 3 mm, or in other forms of a granulometry with equivalent diameter.

Figure 1:
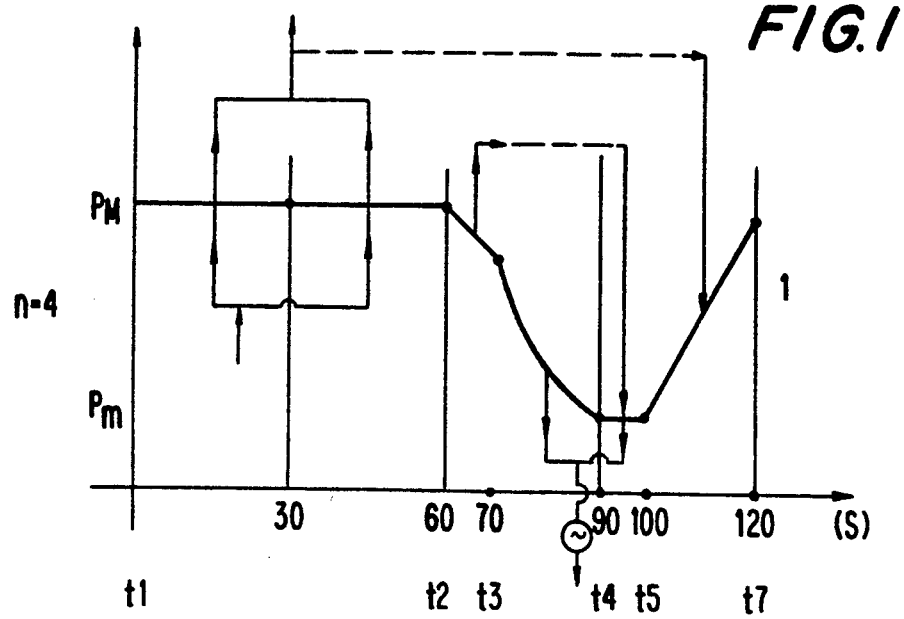
FIGS. 1 to 8 each illustrate an operating cycle "pressure (ordinate)-time (abscissae)" for a duration T, with an adsorber of a group of n adsorbers successively operating with a dephasing T/n.

| FIG. 1: | |
|---|---|
| T sec | 120 sec |
| n | 4 |
| T/n | 30 |
| N | 2 |
| d1 | 60 sec |
| d2 | 10 sec |
| d3 | 20 sec |
| d4 | 10 sec |
| d5 | 20 sec |
| d7 | 30 sec |
| k | 1 |

This cycle has four adsorbers including two adsorbers in simultaneous production, each for a duration of 60 s and each adsorber is regenerated by counter-current pumping followed by elution for a duration of 30 s, by means of a single system of pumping, while ensuring a continuous operation of said pumping system.

As compared to this cycle, with a cycle of the same type (same succession of steps, same time of adsorption of 60 s, continuous operation of the system of pumping, same volume for each adsorber) but including a single adsorber in production at a given moment of its operation, there is obtained a device with three adsorbers and a production reduced by half.

Without substantial loss of yield, nor substantial increase of the energy consumption by cubic meter of oxygen produced, the apparatus with four adsorbers of FIG. 1 has the same production as two separate apparatus each including three adsorbers, representing a gain in productivity of 50%, and moreover the limit of production per unit has been multiplied by a factor of 2.

Figure 2:
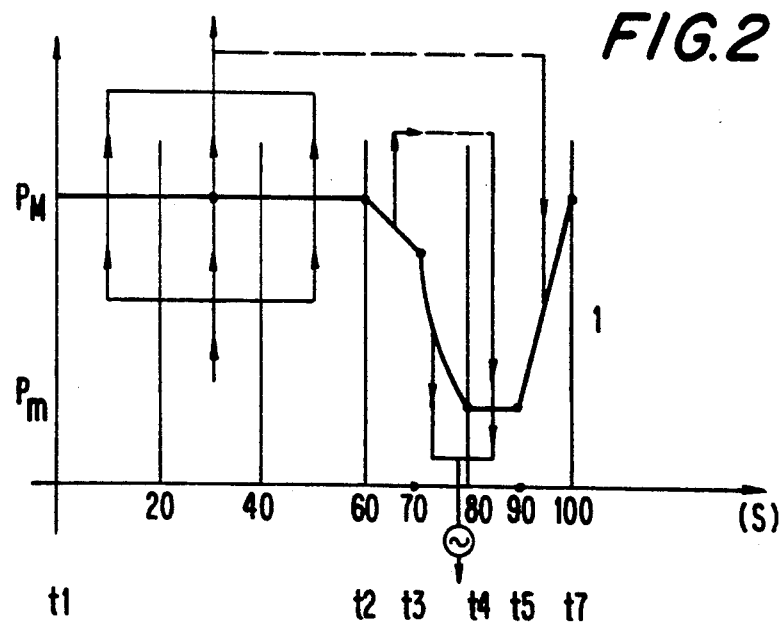

| FIG. 2: | |
|---|---|
| T | 100 sec |
| n | 5 |
| T/n | 20 |
| N | 3 |
| d1 | 60 sec |
| d2 | 10 sec |
| d3 | 10 sec |
| d4 | 10 sec |
| d5 | 10 sec |
| d7 | 20 sec |
| k | 1. |

The cycle of FIG. 2 is distinct from the preceding one by an additional adsorber among the group of adsorbers, and also through an additional adsorber which is in continuous production. The duration of cycle T is shortened to 100 sec, while the duration of production d1 is maintained at 60 sec and the duration of pumping d7 is reduced to 20 sec.

Figure 3:
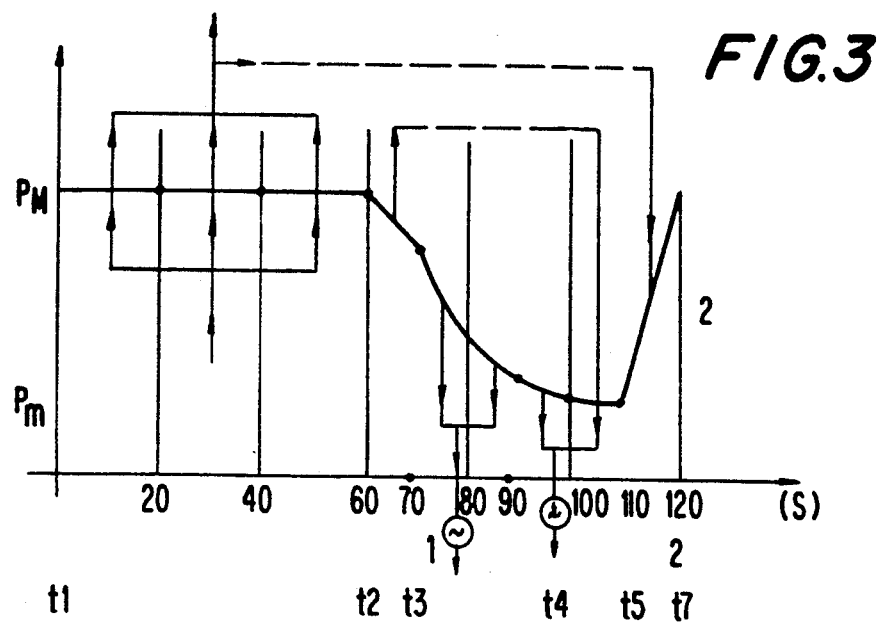

| FIG. 3: | |
|---|---|
| T | 120 sec |
| n | 6 |
| T/n | 20 sec |
| N | 3 |
| d1 | 60 sec |
| d2 | 10 sec |
| d3 | 30 sec |
| d4 | 10 sec |
| d5 | 10 sec |
| d7 | 40 sec |

-continued

| FIG. 3: | |
|---|---|
| k | 2 |

In this embodiment, the duration of pumping d7 of 40 sec, is twice that of dephasing T/n. Two systems of pumping (pump No. 1 and pump No. 2) are therefore used which operate continuously, each being adapted to its own suction and driving back pressure level.

Figure 4:
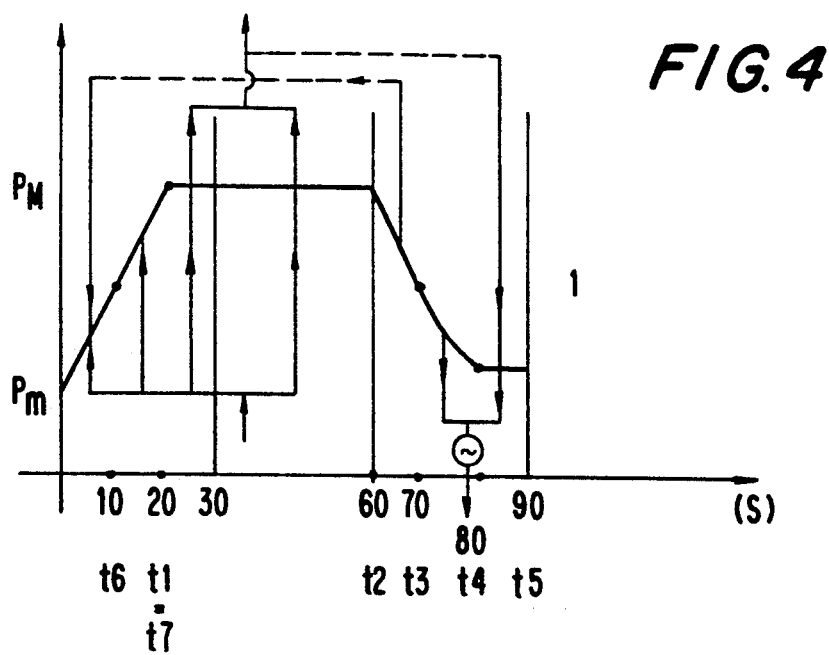

| FIG. 4: | |
|---|---|
| T | 90 sec |
| n | 3 |
| T/n | 30 sec |
| N | successively 1 and 2 |
| d1 | 40 sec |
| d2 | 10 sec |
| d3 | 10 sec |
| d4 | 10 sec |
| d5 | 10 sec |
| d6 | 20 sec |
| d7 | 20 sec |
| k | 1 |

With only three adsorbers, the single pump operates here discontinuously for a duration d7 which is ⅔ that of dephasing. On the other hand, two adsorbers are simultaneously in production, at least at a given moment corresponding to a fraction of the duration T/n of dephasing, a single adsorber being in production during the remaining fraction.

It is noted that the repressurization is here carried out, during 10 seconds, with introduction of gas at the two ends of the adsorbers, namely with co-current air, and an initial depressurization gas being withdrawn co-currently from another adsorber during an initial depressurization and being reintroduced counter-currently in the adsorber during repressurization. During the final repressurization stage, only air is sent co-currently.

Figure 5:
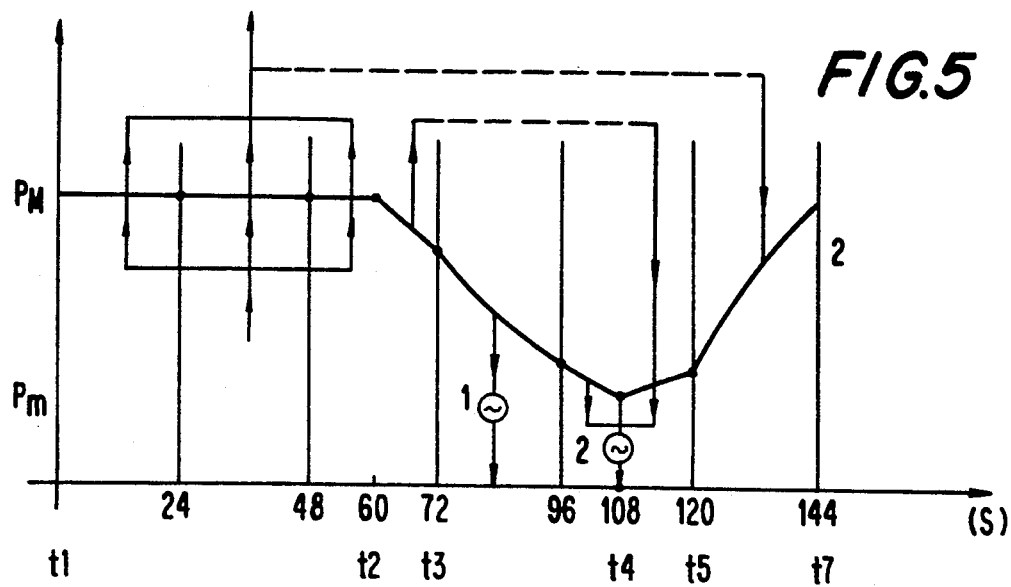

| FIG. 5: | |
|---|---|
| T | 144 sec |
| n | 6 |
| T/n | 24 sec |
| N | successively 2 and 3 |
| d1 | 60 sec |
| d2 | 12 sec |
| d3 | 36 sec |
| d4 | 12 sec |
| d5 | 24 sec |
| d7 | 48 sec |
| k | 2 |

In this embodiment, the duration of pumping (d7=48 sec) requires two pumps (pump 1 and pump 2), one operating at a relatively high pressure level, the other at a less elevated level. Their operation on an adsorber lasts 24 sec in each case, so that they both operate continuously.

Figure 6:
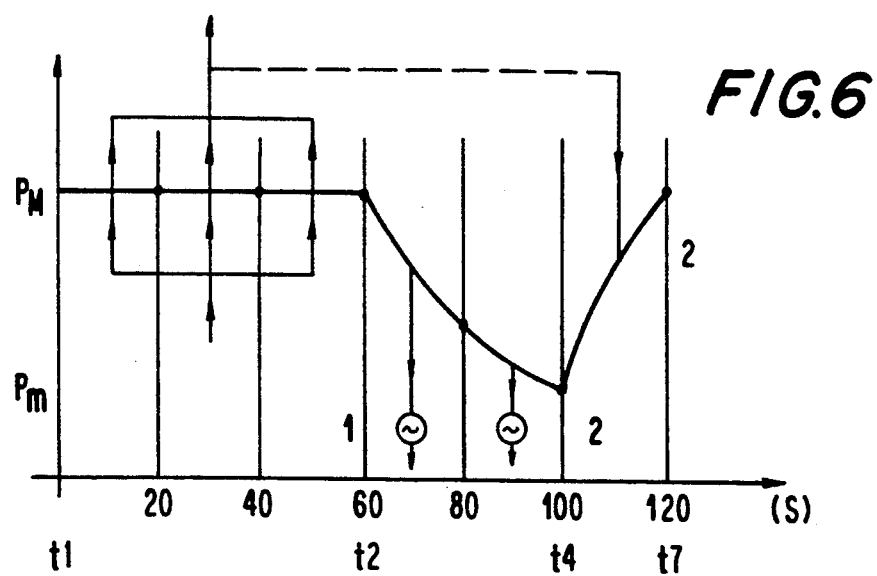

| FIG. 6: | |
|---|---|
| T | 120 sec |
| n | 6 |
| T/n | 20 sec |
| N | 3 |
| d1 | 60 sec |
| d2 | 0 sec |

-continued

| FIG. 6: | |
|---|---|
| d3 | 40 sec |
| d5 | 20 sec |
| d7 | 40 sec |
| k | 2 |

In this embodiment, where the maximum cycle pressure $P_M$ is equal or only slightly higher than atmospheric pressure Pa, depressurization is entirely carried out by pumping with two pumps (pump 1 and pump 2), each operating during a dephasing T/n. There is no elution and the entire repressurization is carried out by withdrawing gas along the production flow.

Figure 7:
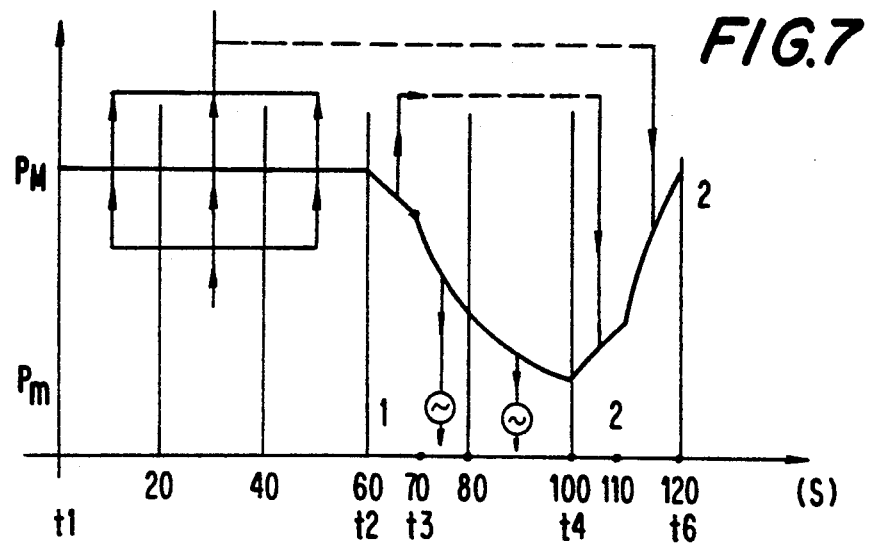

| FIG. 7: | |
|---|---|
| T | 120 sec |
| n | 6 |
| T/n | 20 sec |
| N | 3 |
| d1 | 60 sec |
| d2 | 10 sec |
| d3 | 30 sec |
| d5 | 20 sec |
| d7 | 30 sec |
| k | 2 |

Here the duration of pumping d7 (30 seconds) exceeds the 20 second dephasing. Even if the pressure reduction would be sufficiently moderate, it is suitable to use two pumps, wherein the first one (pump No. 1) operates only during 10 seconds, while the second one (pump No. 2), which is under more reduced pressure, operates during a duration of dephasing. This second pump No. 2 therefore operates continuously, while pump No. 1 operates half the time. It should be noted that the repressurization is completely carried out in counter-current, with gas from the initial depressurization of another adsorber (duration d'5=10 seconds), then with a production gas (duration d"5=10 seconds).

Figure 8:
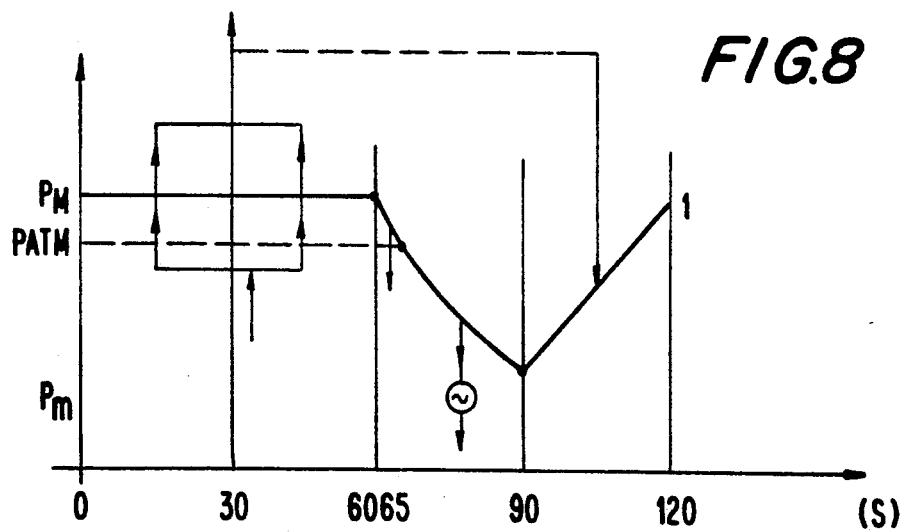

| FIG. 8: | |
|---|---|
| T | 120 sec |
| n | 4 |
| T/n | 30 sec |
| N | 2 |
| d1 | 60 sec |
| d2 | 0 sec |
| d3 | 30 sec |
| d4 | 0 sec |
| d5 | 30 sec |
| d7 | 25 sec |
| k | 1 |

Here the duration of pumping d7 is shorter than the duration of the counter-current depressurization since it is preceded by a step of exposure to counter-current air of the adsorber.

This step enables to initial the step of pumping starting at atmospheric pressure.

| SUMMARIZING TABLE | | | | | | | | |
|---|---|---|---|---|---|---|---|---|
| | FIG. 1 | FIG. 2 | FIG. 3 | FIG. 4 | FIG. 5 | FIG. 6 | FIG. 7 | FIG. 8 |
| T (sec) | 120 | 100 | 120 | 90 | 144 | 120 | 120 | 120 |
| n | 4 | 5 | 6 | 3 | 6 | 6 | 6 | 4 |
| T/n | 30 | 20 | 20 | 30 | 24 | 20 | 20 | 20 |

-continued

SUMMARIZING TABLE

|   | FIG. 1 | FIG. 2 | FIG. 3 | FIG. 4 | FIG. 5 | FIG. 6 | FIG. 7 | FIG. 8 |
|---|---|---|---|---|---|---|---|---|
| N | 2 | 3 | 3 | 1 or 2 | 2 or 3 | 3 | 3 | 2 |
| $d1_{(sec)}$ | 60 | 60 | 60 | 40 | 60 | 60 | 60 | 60 |
| $d2_{(sec)}$ | 10 | 10 | 10 | 10 | 12 | 0 | 10 | 0 |
| $d3_{(sec)}$ | 20 | 10 | 30 | 10 | 36 | 40 | 30 | 30 |
| $d4_{(sec)}$ | 10 | 10 | 10 | 10 | 12 | 0 | 0 | 0 |
| $d5_{(sec)}$ | 20 | 10 | 10 | 10 | 24 | 20 | 20 | 30 |
| $d6_{(sec)}$ | 0 | 0 | 0 | 10 + 10 | 0 | 0 | 0 | 0 |
| $d7_{(sec)}$ | 30 | 20 | 40 | 20 | 48 | 40 | 30 | 25 |
| k | 1 | 1 | 2 | 1 | 2 | 2 | 2 | 1 |

From the above table, it is noted that the pumping duration d7 is always shorter than or equal to the duration of the production step d1. As compared to the total duration of a cycle T, this pumping duration is between 0,20 (cycle of FIG. 2) and 0,33 (cycle of FIG. 5) of the duration of cycle T.

We claim:

1. Process for the production of a gas with substantial oxygen content at a flow higher than 60 T/day by adsorption of nitrogen present in the air, of the type where, in a plurality of n adsorbers, there is successively provided, cyclically according to a period T, on each of said adsorbers, with dephasing T/n from one adsorber to the following one:
   a) a step of co-current production of oxygen, having a duration x, at a pressure at least equal to atmospheric pressure, with introduction of air at least during a substantial portion of said production step;
   b) a step of depressurization, comprising at least in the last part thereof, a counter-current depressurization until reaching a sub-atmospheric pressure obtained by pumping; said pumping being followed, optionally, by a flushing-elution through counter-current flow of oxygen enriched gas; the minimum cycle pressure reached during said pumping step being $P_m$;
   c) a step of repressurization comprising at least a phase of counter-current repressurization with oxygen enriched gas characterized by the combination of the following steps:
   d) the number of adsorbers is at least 3 and the number of adsorbers in simultaneous production is at least 2;
   e) the duration of the production step is longer than dephasing T/n;
   f) the sum of the durations of counter-current depressurization and the optional flushing-elution is at most equal to the duration of the production step; and
   g) the step of pumping according to b) is carried out by means of "k" systems of pumping (k≧1), each being adapted to a level of partial depressurization and exerting its action successively on a same adsorber during a pumping of duration y, so that $$(k-1)\frac{T}{n} < y \leq k\frac{T}{n},$$

with "k" lower by at least one unit than the maximum number of adsorbers in simultaneous production during at least a fraction of the time interval T/n.

2. Process for the production of oxygen according to claim 1, wherein there is provided h) a co-current depressurization between the production step and the step of counter-current depressurization, so as to provide a flushing gas for the flushing-elution, according to b) of another adsorber.

3. Process for the production of oxygen according to claim 1, wherein there is provided i) a co-current depressurization between the step of production and the step of counter-current depressurization so as to provide a partial repressurization gas for the repressurization step c).

4. Process for the production of oxygen according to claim 1, wherein the oxygen enriched gas of step b) and/or step c) consists of production oxygen.

5. Process for the production of oxygen according to claim 1, wherein the phase of counter-current repressurization of repressurization step c) is carried out with production gas.

6. Process for the production of oxygen according to claim 1, wherein the production step is carried out at least in part at maximum pressure.

7. Process for the production of oxygen according to claim 1, wherein the production step is carried out at least in part at increasing pressure.

8. Process for the production of oxygen according to claim 1, wherein the step of repressurization c) includes at least one phase of co-current repressurization with air.

9. Process for the production of oxygen according to claim 1, wherein the maximum cycle pressure $P_M$ is between atmospheric pressure and $1.6 \times 10^5$ Pascal, while the minimum cycle pressure is between $0.2 \times 10^5$ and $0.5 \times 10^5$ Pascal.

10. Process for the production of a gas having a substantial content of oxygen, according to claim 1, wherein the duration of pumping according to b) is between 20% and 40% of the duration of cycle T.

11. Process for the production of oxygen according to claim 3, wherein there is a first provided the depressurization according to i) then a co-current depressurization between the production step and the step of counter-current depressurization, so as to provide a flushing gas for the flushing-elution step b) of another adsorber.

* * * * *